W. SKARNULIS.
AUTOMOBILE SIGNAL.
APPLICATION FILED JULY 16, 1919.
1,328,404.
Patented Jan. 20, 1920.
3 SHEETS—SHEET 2.
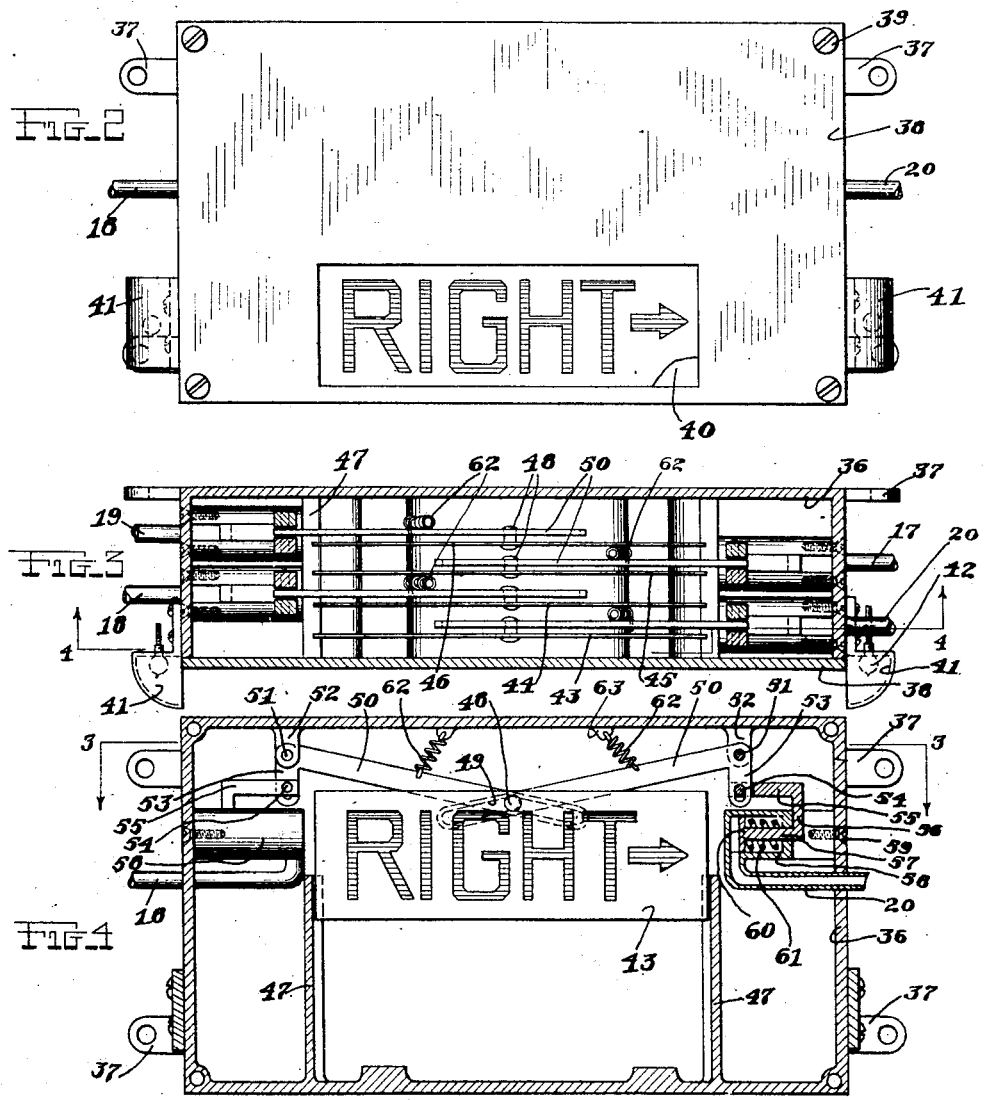
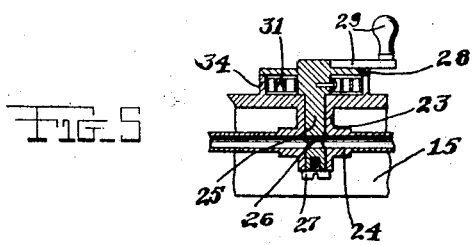
Inventor
William Skarnulis

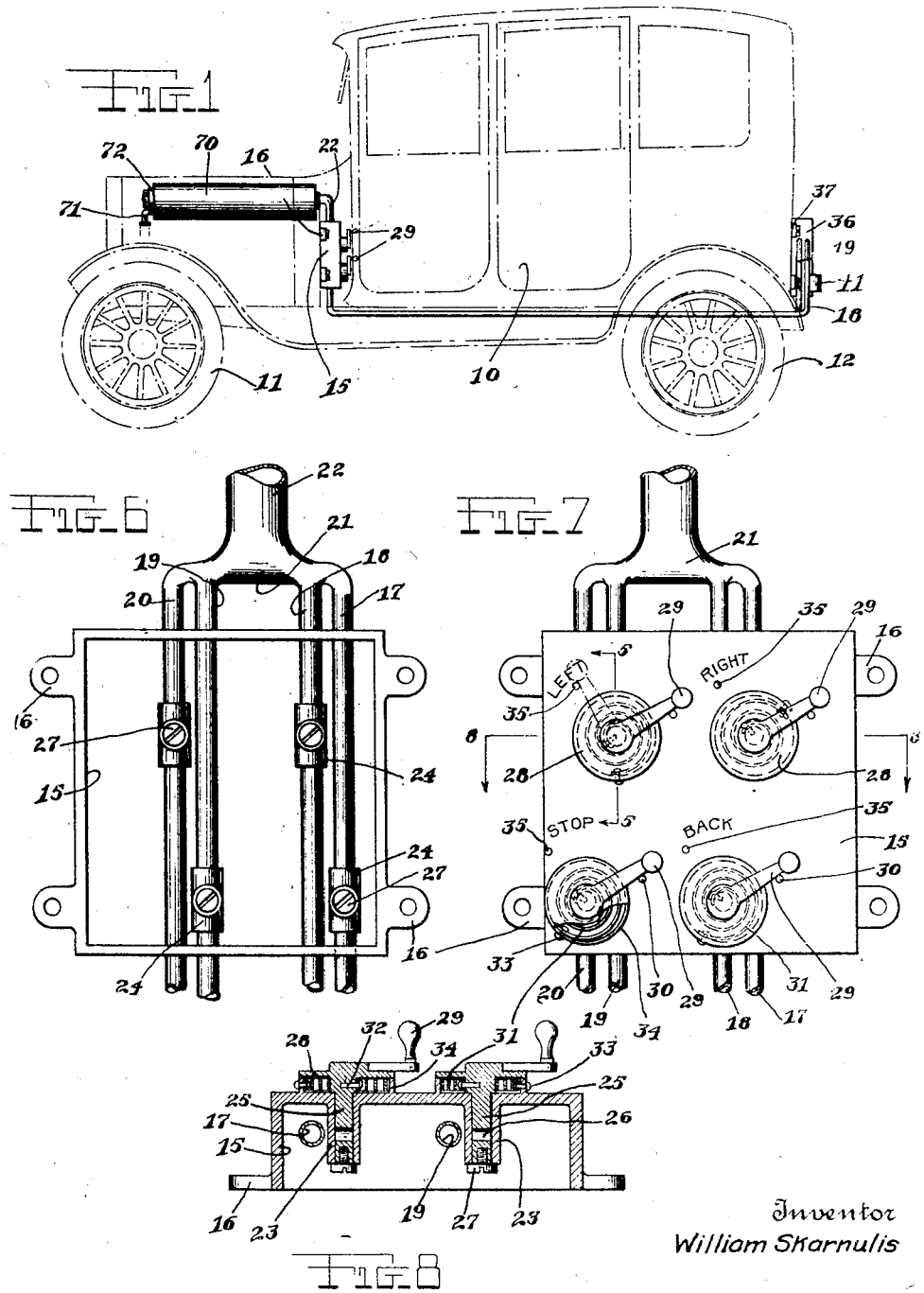

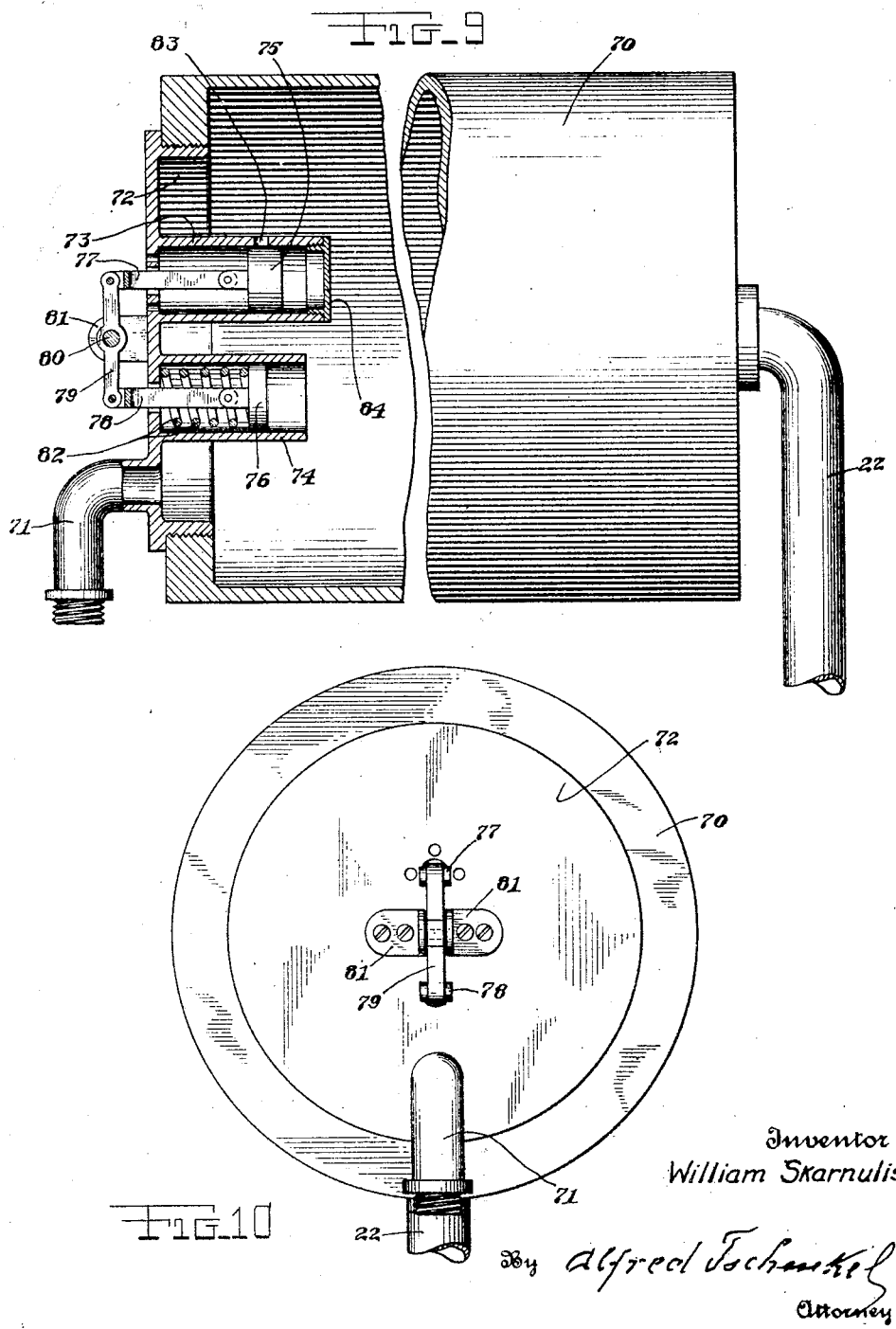

UNITED STATES PATENT OFFICE.

WILLIAM SKARNULIS, OF NEW BRITAIN, CONNECTICUT.

AUTOMOBILE-SIGNAL.

1,328,404.

Specification of Letters Patent. Patented Jan. 20, 1920.

Application filed July 16, 1919. Serial No. 311,149.

*To all whom it may concern:*

Be it known that I, WILLIAM SKARNULIS, a citizen of Russia, residing at 43 Wilson street, New Britain, county of Hartford, and State of Connecticut, have invented certain new and useful Improvements in Automobile-Signals, of which the following is a specification.

This invention has for its object the provision of a visible signal displayed at the rear of a car by which may be shown the intention of the driver to stop, start or turn the car in either direction.

A further object is to provide means whereby the signal may be actuated by the exhaust of the motor, the same being controlled from a point convenient of access by the driver, the signal being positive in its operation and not dependent upon electrical devices which frequently become disordered.

These and other like objects are attained by the novel construction and combination of parts hereinafter described and shown in the accompanying drawings, forming a material part of this disclosure, and in which—

Figure 1 is a side elevational view indicating the attachment of the signaling device to a conventional type of car.

Fig. 2 is an enlarged front elevational view showing the signal device.

Fig. 3 is a horizontal sectional view taken on line 3—3 of Fig. 4.

Fig. 4 is a vertical sectional view taken on line 4—4 of Fig. 3.

Fig. 5 is a fragmentary transverse sectional view taken on line 5—5 of Fig. 7.

Fig. 6 is a bottom plan view of a signal controller.

Fig. 7 is a front view of the same.

Fig. 8 is a transverse sectional view taken on line 8—8 of Fig. 7.

Fig. 9 is a partial side elevational, partial longitudinal sectional view of the exhaust reservoir.

Fig. 10 is a front elevational view of the same.

Referring to the drawings in detail, the numeral 10 indicates a conventional type of automobile, mounted upon wheels 11 and 12, and provided with all the necessary equipment and accessories commonly employed.

Secured upon the dashboard or its equivalent, at the front part of the vehicle 10, is a rectangular chambered casing 15, having extending lateral ears 16 through which bolts, screws, or like securing means may be passed, and entering into the upper part of the casing 15, are tubes 17, 18, 19, and 20, connected at their outer ends in a header 31, supplied by the pipe 22 leading from a tubular reservoir 70 disposed over the motor used to propel the vehicle, and within its casing, the reservoir receiving the exhaust gases from the motor by the tubular elbow 71.

This elbow extends to a head 72 set in the end of the reservoir, and formed with the head are two bored cylindrical extensions, respectively 73 and 74, in which operate pistons 75 and 76, their stems being pivotally engaged by links 77 and 78 with the respective ends of an oscillating lever 79 journaled on a pin 80 set in opposed brackets 81 extending out from the head 72.

The inner end of the cylinder 74 is open to the interior of the reservoir 70 and should an excessive pressure occur therein it will move the piston outward, against the pressure of a coiled compression spring 82 encircling the link 78, causing the lever to oscillate and by its connections press the piston 75 inwardly past the opening 83 in the wall of the cylinder 73, acting as a safety valve or vent for the gases, which are free to pass out at the outer, partially open end of the cylinder, reducing the pressure to equalize the strength of the spring 82, it being understood that the inner end of the cylinder is provided with a head or cover 84.

Extending downward into the chamber within the hollow casing 15, from the cover wall, are projections 23, having longitudinal, opposite disposed bosses 24 into which the respective tubes enter, the projections being drilled to receive stems 25, containing transverse passages 26, the same being held in adjusted position by screws 27 the heads of which contact with the lower ends of the extensions 23.

The upper ends of the stems 25, which constitute valves in the pipes 17 and 20 inclusive, extend through openings in the cover of the casing 15 and are provided with flanged disk tops 28, having extending lever-like operating handles 29, normally held in contact with the stop pins 30 by means of flat spiral springs 31, their innermost coils being fixed to the stems by pins 32, while the outer coils of the springs are secured by other pins 33 to rings 34, extending up from the outer surface of the casing 15, other stop pins 35 being provided to limit the movement of the lever handles 29.

Attached to the rear of the vehicle is another casing 36 by means of extending ears 37, the casing being provided with a cover 38, removably engaged by screws 39, passing into appropriate openings formed in the corners of the casing, the cover having a rectangular opening 40, extending longitudinally in the lower portion, while secured upon the end elements of the casing are a pair of reflectors 41, adapted to direct the rays of lamps 42, so as to clearly show the inscribed plates 43, 44, 45, and 46, when displayed, the plates bearing words indicating the proposed intention of the operator, all of the several plates being slidable within guides 47, extending transversely across the interior of the casing 36 at its lower side.

All of the several plates are independently supported by loose rivets 48, the same being slidably engaged in slots 49, formed in the outer ends of the long arms 50, of bell-crank levers, pivoted upon the pins 51, set in lugs 52, extending down from the upper, inner side of the casing, while the short arms 53 of the levers are also slotted and engaged with the pins 54, set in arms 55, having angular elements 56 merged into rods 57, turned parallel with the arms 55, and adapted to enter openings formed in the cylinders 58, secured by screws 59, the cylinders being arranged in pairs and extending parallel inward from the end elements of the casing 36.

Entering the opposite, inner ends of the cylinders 58, are pipes 17, 18, 19, and 20, so that when the valves actuated by the levers 29 open, the exhaust enters the cylinders pressing against pistons 60, formed at the outer end of the rods 57, the pistons being normally pressed outward due to coiled compression springs 61 encircling the rods and abutting at their inner ends against the outer wall of the cylinder. The levers 50 are normally held in a raised position due to the pull of tension springs 62, secured in lugs 63, extending downward from the upper wall of the casing at one end and directly connected with the levers at their opposite inner ends.

In operation, when the engine is running, the exhaust enters the reservoir, passes into the header 21 and is distributed therefrom to the several pipes 17 to 22 inclusive, so that upon moving the levers 29, the exhaust is entered into the corresponding cylinder, pressing the pistons and connections out against the springs 61 and moving the levers 50 downward against the pull of the springs 62, causing the desired signal plate to be lowered in its guides so as to be clearly exposed through the opening 40, which, by means of the light reflected thereon, can be seen at a considerable distance, and immediately upon releasing the lever handle 29, the coiled spring 28 will turn the handle to its initial position without volition upon part of the operator.

From the foregoing it will be seen that a neat, practical and effective signal device has been disclosed, operative by the exhaust gases of the engine instantaneously and which requires little or no exertion on part of the operator.

Having thus described my invention what I claim as new and desire to secure by Letters Patent, is—

In an automobile signal actuating mechanism of the character described, the combination with a casing secured to the front of a vehicle, of a plurality of signal plates within said casing, bell-crank levers to the long arms of which said plates are slidably engaged, angular elements to which the front arms of said levers are connected by a pin and slot connection, pairwise arranged cylinders within the casing adapted to receive one arm of said angular elements constituting a piston adapted to work in said cylinder and supply pipes for supplying exhaust gases to said cylinders and pistons, springs for normally holding the signal plates in their elevated position of rest, springs for normally holding the pistons in their advanced positions and means for controlling the supply of the exhaust gases.

In testimony whereof I have affixed my signature.

WILLIAM SKARNULIS.